(12) United States Patent
Shabbir et al.

(10) Patent No.: US 11,836,028 B2
(45) Date of Patent: Dec. 5, 2023

(54) SYSTEM AND METHOD FOR CLOSED-LOOP MEMORY POWER CAPPING

(71) Applicant: DELL PRODUCTS, LP, Round Rock, TX (US)

(72) Inventors: Hasnain Shabbir, Round Rock, TX (US); Carlos Henry, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 222 days.

(21) Appl. No.: 17/153,583

(22) Filed: Jan. 20, 2021

(65) Prior Publication Data

US 2022/0229483 A1    Jul. 21, 2022

(51) Int. Cl.
*G06F 1/32* (2019.01)
*G06F 1/20* (2006.01)
*G06F 11/30* (2006.01)
*G06F 1/3225* (2019.01)

(52) U.S. Cl.
CPC ............ *G06F 1/3225* (2013.01); *G06F 1/206* (2013.01); *G06F 11/3037* (2013.01); *G06F 11/3062* (2013.01)

(58) Field of Classification Search
CPC .... G06F 1/3225; G06F 1/206; G06F 11/3037; G06F 11/3062
See application file for complete search history.

(56) References Cited

U.S. PATENT DOCUMENTS

| | | | |
|---|---|---|---|
| 9,519,323 B2* | 12/2016 | Shabbir | G06F 1/206 |
| 9,612,880 B1* | 4/2017 | Hedley | G06F 1/206 |
| 9,743,552 B2 | 8/2017 | Ragupathi et al. | |
| 10,698,457 B2 | 6/2020 | Lovicott et al. | |

(Continued)

*Primary Examiner* — Jaweed A Abbaszadeh
*Assistant Examiner* — Cheri L Harrington
(74) *Attorney, Agent, or Firm* — Larson Newman, LLP

(57) ABSTRACT

An information handling system includes a management controller configured to determine whether to initiate control of power consumption of a memory subsystem of the information handling system. A closed-loop memory thermal controller may receive temperature values to determine a temperature setpoint for the memory subsystem, and calculate an error value that is a difference between the temperature setpoint and a temperature measurement. If the error value is within a temperature margin, then the thermal controller may determine a proportional-integral power signal based on the temperature margin and the temperature measurement; and determine a proportional-integral gain based on a maximum rate of change of the temperature measurement between polling events of the temperature measurement and a polling rate of the temperature measurement. The thermal controller may also determine a modified proportional-integral power signal based on the proportional-integral gain, wherein the modified proportional-integral power signal is used to determine a power adjustment value of the memory subsystem; and in response to an initiation from the management controller to control the power consumption of the memory subsystem, control the power consumption of the memory subsystem based on the power adjustment value.

20 Claims, 9 Drawing Sheets

(56) References Cited

U.S. PATENT DOCUMENTS

| | | | | |
|---|---|---|---|---|
| 2006/0222045 | A1* | 10/2006 | Byquist | G01K 7/42 |
| | | | | 374/E7.042 |
| 2008/0058999 | A1* | 3/2008 | Khodorkovsky | G06F 1/3296 |
| | | | | 700/297 |
| 2010/0134959 | A1* | 6/2010 | Fife | H05K 7/20945 |
| | | | | 361/678 |
| 2010/0169690 | A1* | 7/2010 | Mundada | G06F 1/3225 |
| | | | | 713/340 |
| 2012/0116590 | A1* | 5/2012 | Florez-Larrahondo | |
| | | | | H05K 7/1488 |
| | | | | 361/679.48 |
| 2012/0124403 | A1* | 5/2012 | Goodrum | G06F 1/3203 |
| | | | | 713/320 |
| 2016/0274629 | A1* | 9/2016 | Lovicott | G06F 1/206 |
| 2016/0320995 | A1* | 11/2016 | Warriner | G06F 1/206 |
| 2017/0017281 | A1* | 1/2017 | Artman | G06F 9/44505 |
| 2017/0063088 | A1* | 3/2017 | Wang | G05B 15/02 |
| 2017/0264185 | A1* | 9/2017 | Karlsson | H02M 3/157 |
| 2017/0315568 | A1* | 11/2017 | Lovicott | G05D 23/1919 |
| 2020/0080902 | A1* | 3/2020 | Tan | G06F 1/324 |
| 2022/0128419 | A1* | 4/2022 | Byggmästar | G01K 3/10 |
| 2022/0164021 | A1* | 5/2022 | Egan | G06F 11/3058 |
| 2022/0229483 | A1* | 7/2022 | Shabbir | G06F 1/206 |

* cited by examiner

| Rules | | | Numerical Representation | | |
|---|---|---|---|---|---|
| Error | Error Rate | Adjustment | Error | Error Rate | Adjustment |
| Low Negative | Low Negative | Zero Error | 1 | 1 | 0 |
| Medium Negative | Low Negative | Zero Error | 2 | 1 | 0 |
| Small Negative | Low Negative | Large Positive | 3 | 1 | 1.5 |
| ... | | | | | |
| Zero Error | Low Negative | Large Positive | 4 | 1 | 1.5 |
| ... | | | | | |

| Polling Rate(s) | Maximum Temperature Ramp Rate [C°/Polling Cycle] | | | | | | | | | |
|---|---|---|---|---|---|---|---|---|---|---|
| | 1 | 2 | 3 | 4 | 5 | 6 | 7 | 8 | 9 | 10 |
| 1 | 0.050 | 0.100 | 0.150 | 0.200 | 0.250 | 0.300 | 0.350 | 0.400 | 0.450 | 0.500 |
| 5 | 0.010 | 0.020 | 0.030 | 0.040 | 0.050 | 0.060 | 0.070 | 0.080 | 0.090 | 0.100 |
| 10 | 0.005 | 0.010 | 0.015 | 0.020 | 0.025 | 0.030 | 0.035 | 0.040 | 0.045 | 0.050 |
| 60 | 0.001 | 0.002 | 0.003 | 0.003 | 0.004 | 0.005 | 0.006 | 0.007 | 0.008 | 0.008 |
| 300 | 0.000 | 0.000 | 0.001 | 0.001 | 0.001 | 0.001 | 0.001 | 0.001 | 0.002 | 0.002 |

| Index | Platform | Sensor's Name | Automated Power Cap | | |
|---|---|---|---|---|---|
| | | | Enable Automated Power Capping (Yes/No) | Power Cap Temperature Target - Percentage from Critical | Power Subsystem to Cap |
| 1 | IDRAC | Exhaust | No | 50% | System Power Cap |
| ... | | | | | |
| 11 | IDRAC | CPU | Yes | 30% | CPU Power Cap |
| 12 | IDRAC | Memory | Yes | 30% | Memory Power Cap |
| ... | | | | | |

*FIG. 8*

| | Temperature | Memory Power Cap |
|---|---|---|
| PD Output Gain | 0.5 | 0.5 |
| PI Output Gain | 1 | 1 |
| Ramp Rate Gain Control | ON | ON |
| PD Error Input Gain | 0.1 | 1 |
| PD Delta Error Input Gain | 3 | 0 |
| PI Error Input Gain | 0.2 | 0.2 |
| PI Error History | 10 | 10 |
| Steady State Threshold Value | 0.1 | 0.1 |
| Steady State Running Average History | 4 | 4 |

US 11,836,028 B2

SYSTEM AND METHOD FOR CLOSED-LOOP MEMORY POWER CAPPING

FIELD OF THE DISCLOSURE

The present disclosure generally relates to information handling systems, and more particularly relates to closed-loop memory power capping.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a management controller configured to determine whether to initiate control of power consumption of a memory subsystem of the information handling system. A closed-loop memory thermal controller may receive temperature values to determine a temperature setpoint for the memory subsystem, and calculate an error value that is a difference between the temperature setpoint and a temperature measurement. If the error value is within a temperature margin, then the thermal controller may determine a proportional-integral power signal based on the temperature margin and the temperature measurement; and determine a proportional-integral gain based on a maximum rate of change of the temperature measurement between polling events of the temperature measurement and a polling rate of the temperature measurement. The thermal controller may also determine a modified proportional-integral power signal based on the proportional-integral gain, wherein the modified proportional-integral power signal is used to determine a power adjustment value of the memory subsystem; and in response to an initiation from the management controller to control the power consumption of the memory subsystem, control the power consumption of the memory subsystem based on the power adjustment value.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8 is a diagram illustrating a table of power cap parameters for closed-loop memory power capping, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
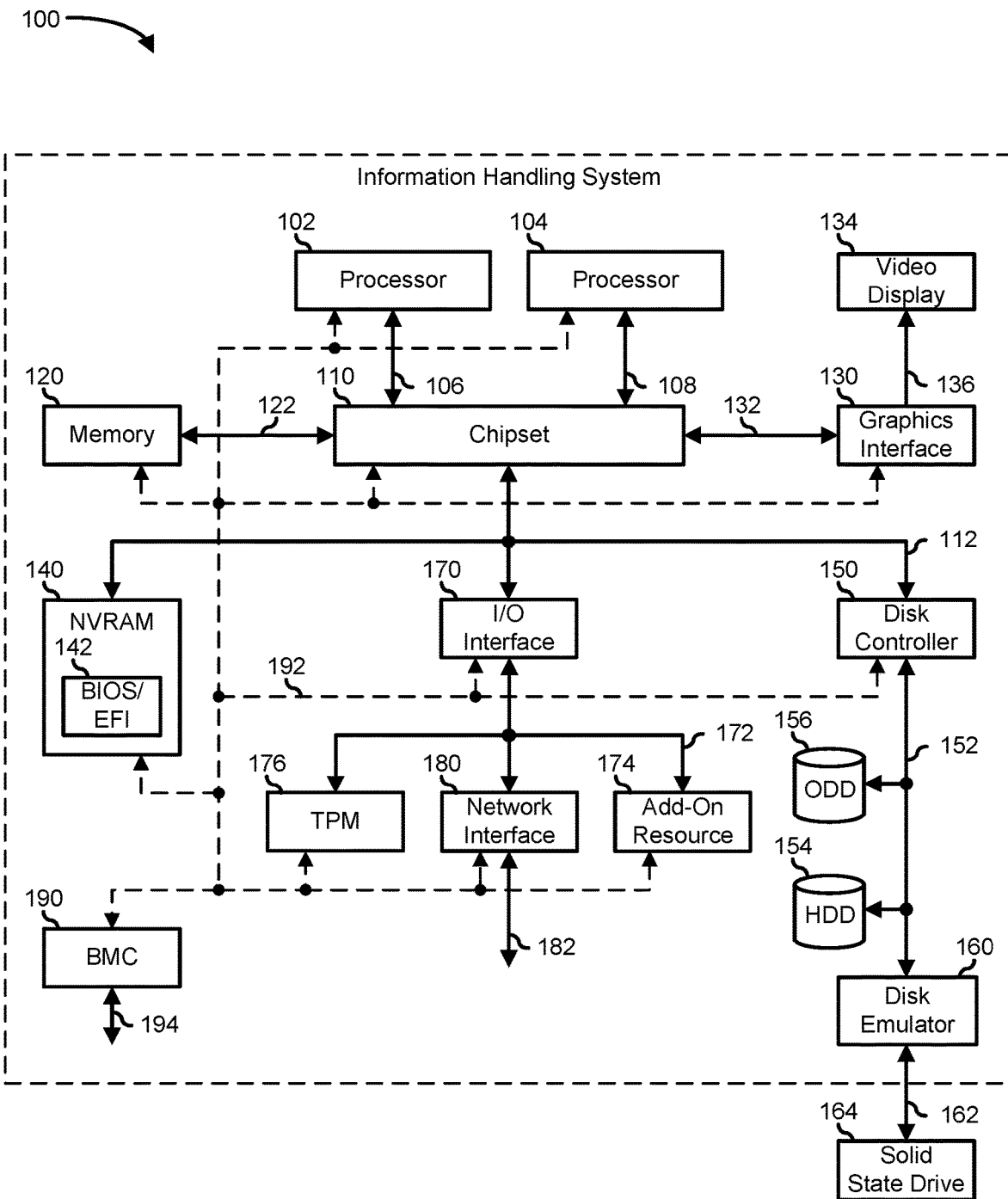
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a random access memory (RAM) or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Memory throttling is used to prevent memory modules such as a DIMM from overheating. With increased demands for data bandwidth, the increased power consumption of the memory modules is resulting in increased temperature. Memory throttling may be implemented for thermal management such as via closed-loop thermal throttling (CLTT). CLTT may be used in conditions where the memory temperature cannot be controlled to below specification by traditional system cooling. For example, the present system and method are advantageously used when there is fan failure, or when the fan is running full speed but the temperature of the memory is still over-specification.

CLTT uses a traditional power capping approach wherein the DIMM is tested and different discrete values between zero and two hundred fifty-five and zero are defined as static throttling limits. If the throttling limit is set at two hundred fifty-five then there is no bandwidth limit, which means that the window is fully open. If the throttling limit is set to zero, then no traffic is allowed, which means that the window is closed. Typically, three discrete throttling values are defined in the BIOS registers and thermal tables. These values can be overridden, but the development work to determine these override values are extensive and power capping based on these values is inefficient due to dependencies to underlying power controls and configuration of the DIMM. CLTT uses DIMM temperature feedback to initiate memory throttling. However, there is no feedback on whether the static throttling limits are sufficient to impact the power requirements and temperature of the DIMM. Thus, approaches to improving the power capping of memory modules of an information handling system are desirable.

Figure 2:
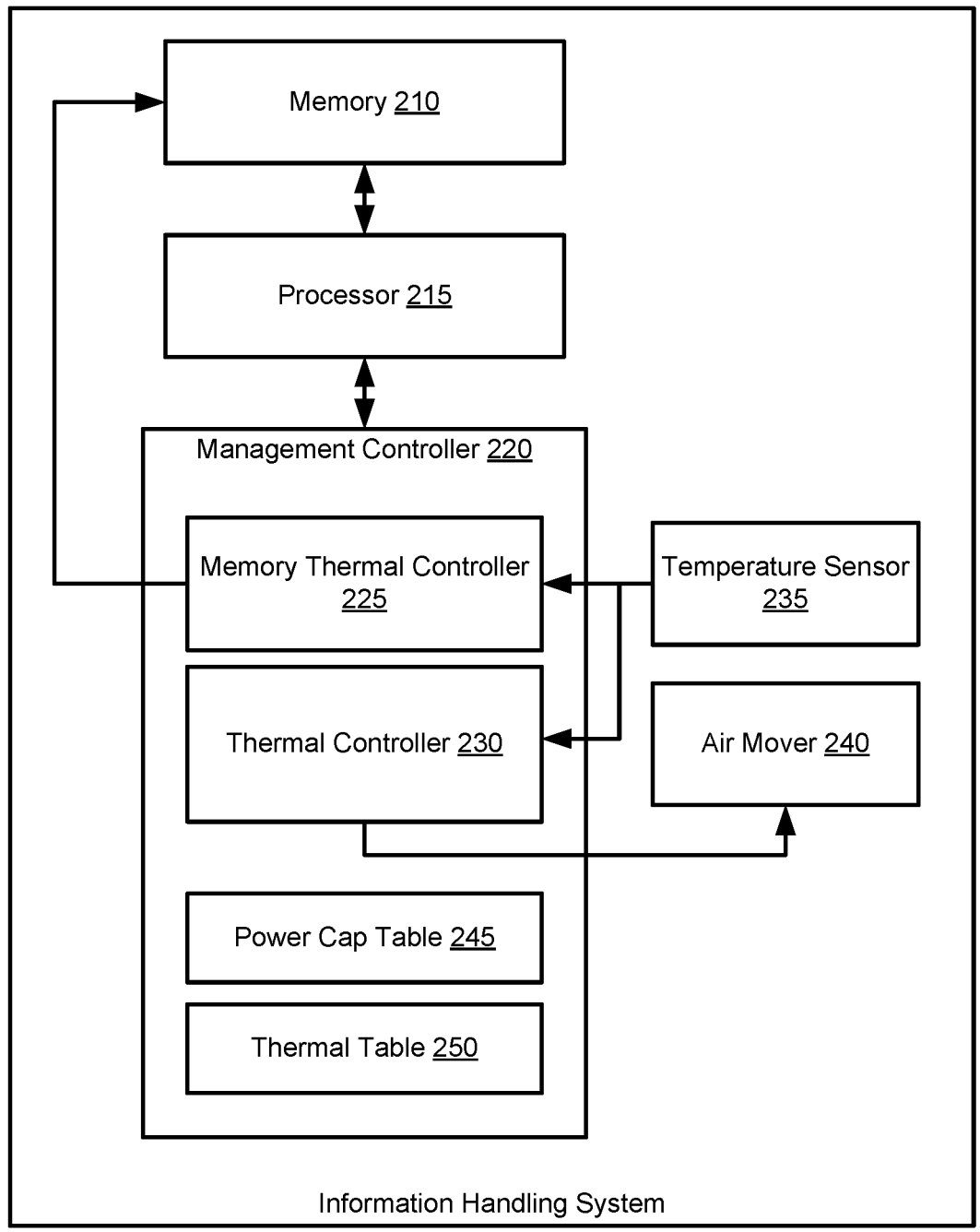
FIG. 2 is a block diagram illustrating a system for closed-loop memory power capping, according to an embodiment of the present disclosure.

FIG. 2 shows a block diagram of an example of information handling system 200 where systems and methods for power management and control of a memory subsystem. The present system and method is a temperature-based throttling mechanism of the memory bandwidth which controls power to the memory subsystem in response to temperature feedback. This may be used in conditions where the memory temperature cannot be controlled to below specification by traditional system cooling. Information handling system 200, which is similar to information handling system 100 of FIG. 1, includes a memory 210, a processor 215, a management controller 220, a temperature sensor 235, and an air mover 240. Management controller 220 includes a memory thermal controller 225, a thermal controller 230, a power cap table 245, and a thermal table 250.

Information handling system 200 may include a server chassis configured to house a plurality of servers or "blades." In other embodiments, information handling system 200 may include a personal computer such as a desktop computer, a laptop computer, a mobile computer, and/or a notebook computer. In yet another embodiment, information handling system 200 may include a storage enclosure configured to house a plurality of physical disk drives and/or other computer-readable media for storing data.

Memory 210 may be communicatively coupled to processor 215 and may include any system, device, or apparatus operable to retain program instructions or data for a period of time. Memory 210 may include a DIMM, a RAM, electrically erasable programmable read-only memory (EEPROM), a personal computer memory card international association (PCMCIA) card, flash memory, magnetic storage, opto-magnetic storage, or any suitable selection and/or array of volatile or non-volatile memory that retains data after power to information handling system 200 is turned off.

Processor 215 may include any system, device, or apparatus operable to interpret and/or execute program instructions and/or process data, and may include, without limitation a microprocessor, microcontroller, digital signal processor (DSP), application-specific integrated circuit (ASIC), or any other digital or analog circuitry configured to interpret and/or execute program instructions and/or process data. In some embodiment, processor 215 may interpret and/or execute program instructions stored in memory 210 and/or another component of information handling system 200.

Management controller 220 may include any system, device, or apparatus configured to facilitate management and/or control of information handling system 200 and/or one or more of its components. Management controller 200 may be configured to issue command and/or other signals to manage and/or control information handling system 200 and/or its components. Management controller 220 may include a microprocessor, microcontroller, DSP, ASIC, field programmable gate array (FPGA), EEPROM, or any combination thereof. Management controller 220 may also be configured to provide out-of-band management facilities for management of information handling system 200. Such management may be made by management controller 220 even if information handling system 200 is powered off or powered to a standby state. In certain embodiments, management controller 220 may include or may be an integral part of a BMC, a remote access controller such as a Dell Remote Access Controller (DRAC), an iDRAC, or an enclosure controller. In other embodiments, management controller 220 may include or may be an integral part of a chassis management controller (CMC).

Memory thermal controller 225 may include a fuzzy logic processor subsystem based adaptive closed-loop thermal controller configured to prevent memory 210 from overheating when air mover 240 is insufficient to provide adequate cooling. Memory thermal controller 225 may be a proportional-integral/proportional-differential (PI/PD) controller. Memory thermal controller 225 may prevent memory 210 from overheating by power capping or throttling of memory 210 to reduce heat generated by memory 210. The power capping or throttling may be initiated by management controller 220 to prevent the bandwidth from exceeding the throttling settings if it detects that memory 210 approaches a thermal limit. In particular, memory thermal controller 225 takes a temperature margin relative to temperature critical and/or target limits as input. Memory thermal controller 225 may include an interface in communication temperature sensor 235 that measures the current temperature of memory 210.

In contrast to traditional power capping mechanisms which may utilize a discrete number of static throttling limits, memory thermal controller 225 provides power capping limits as output to control the power consumption of the memory 210. The power capping limits may be gradually decreased as the temperature margin, which is configurable or customizable, is reduced. Thus, thermal controller 230 may enable automatic gradual power reduction to the memory 210. Memory thermal controller 225 works with thermal controller 230 in preventing the information handling system or its components from overheating. For example, memory thermal controller 225 may kick in when temperature control provided by thermal controller 230 via air mover 240 is insufficient.

Thermal controller 230 may be configured to receive one or more signals indicative of one or more temperatures within information handling system 200 and calculate a fan signal to drive air mover 240. Temperature sensor 235 may be any system, device, or apparatus, such as a thermometer or a thermistor, configured to communicate a signal to thermal controller 230 indicative of a temperature within information handling system 200. Air mover 240 may include any mechanical or electro-mechanical system, apparatus, or device operable to move air and/or other gases, such as a blower, to cool components of information handling system 200. The speed of air mover 240 may be controlled by thermal controller 230.

Power cap table 245 may include a map, list, array, table, or other suitable data structure with one or more entries, each entry setting forth power cap parameters such as enabling automated power capping, power cap temperature target, and power subsystem to cap. Power cap table 245 may be used in information handling system 200 and may be constructed and stored within a read-only memory of management controller 220 prior to the runtime of information handling system 200.

Thermal table 250 may include a map, list, array, table, or other suitable data structure with one or more entries, each entry setting forth thermal parameters such as target temperature, maximum temperature, PD output gain, PI output gain, PI error input gain, etc. Thermal table 250 may be constructed and stored within a ROM or a non-volatile RAM of management controller 220 prior to the runtime of information handling system 200. Thermal table 250 may be updated during a firmware update to management controller 220. Thermal table 250 may also be updated by an administrator via a graphical user interface or a command-line associated with management controller 220.

In addition to memory 210, processor 215, management controller 220, temperature sensor 235, and air mover 240, information handling system 200 may include one or more other components. In addition, for the sake of clarity and exposition of the present disclosure, FIG. 2 depicts only one air mover 240 and temperature sensor 235. In embodiments of the present disclosure, information handling system 200 may include any number of air movers 240 and temperature sensors 235.

Figure 3:
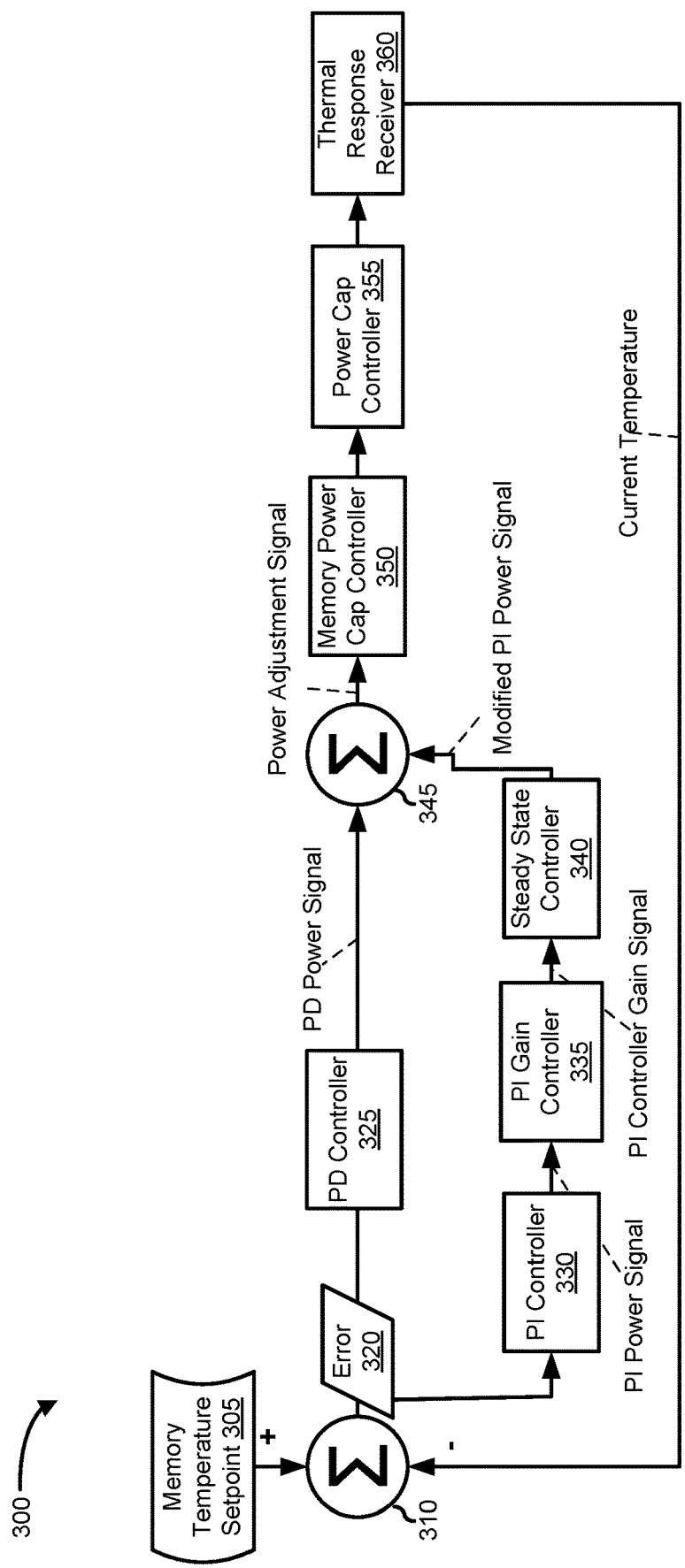
FIG. 3 is a block diagram illustrating a system for closed-loop memory power capping, according to an embodiment of the present disclosure.

FIG. 3 shows a block diagram of a memory thermal controller 300 for adaptive closed-loop power capping to enable a granular level power control of a memory subsystem. Memory thermal control 300, which is similar to memory thermal controller 225 of FIG. 2, manages memory performance by limiting bandwidth to the memory subsystem, therefore capping the power consumption and preventing the memory subsystem from overheating. Memory thermal controller 300 includes an input controller 310, a PD controller 325, a PI controller 330, a PI gain controller 335, a steady-state controller 340, a power adjustment controller 345, a memory power cap controller 350, a power cap controller 355, and a thermal response receiver 360. The components of memory thermal controller 300 may be implemented in hardware, software, firmware, or any combination thereof.

Memory thermal controller 300 may receive one or more values to calculate a memory temperature setpoint 305 by input controller 310. For example, memory thermal controller 300 may receive values for a temperature margin, memory temperature critical limit, memory temperature target limit, etc. These values may also be retrieved by memory thermal controller 300 from a power cap table or a thermal table. The memory temperature target limit may be above fan cooling target temperature and typically within the window where fans are already at full speed. Typically, memory thermal controller 300 may be triggered when the measured temperature approaches the temperature margin of this window. For example based on the formula below, if the memory temperature is ninety-five degrees centigrade, the memory temperature target limit is ninety degrees centigrade, and the temperature margin is thirty percent, when the memory subsystem measured temperature approaches within thirty percent of the window (95° C.–90° C.=5° C., 30% of 5° C.=1.5° C.), the memory subsystem power capping may be triggered. Here, memory thermal controller may be triggered if the difference between the temperature setpoint and the measured temperature approaches 1.5° C. The PD controller part of the PI/PD controller may be disabled so there won't be power reduction on initial temperature fluctuation, which tends to be larger.

A fan thermal controller such as thermal controller 230 may be in charge of preventing the temperature of the components of the information handling system such as the processor and memory subsystem from reaching power capping levels by adjusting the fan speed. If it is unable to do due to fast transient or simply the system has reached its cooling capacity wherein the fans are operating at capacity, this automated granular power capping for the memory subsystem may be enabled, such as when approaching its predefined temperature target limit. The output of the memory thermal controller may be a power change signal for adjusting the power to the memory subsystem.

Memory thermal controller 300 may be configured to disable a PD response by disabling PD controller 325 to avoid a performance reduction every time the memory temperature increases. The PD response may be disabled by tuning a value in the thermal table. For example, the PD delta error input gain parameter may be set to zero to disable PD controller 325. Instead, PI controller 330 of memory thermal controller 300 may be used to handle the power adjustment of the memory subsystem. With this configuration, the initial temperature spikes of the memory subsystem may be handled instead by a thermal controller configured to maintain an appropriate level of cooling, increase cooling, or decrease cooling, as appropriate via an air mover, such as thermal controller 230 of FIG. 2.

Input controller 310 may be configured to calculate an error signal 320 between a temperature setpoint 305 and a measured temperature such as from a temperature sensor and received my thermal response receiver 360. Error signal 320 may be communicated to other components of memory thermal controller 300 such as PD controller 325 and PI controller 330. The temperature setpoint 305 may be based on the formula: [Memory temperature critical limit−[Temperature Margin*(Memory temperature critical limit−Memory temperature target limit)]. The memory temperature setpoint may be the desired temperature for power capping and may be greater than the memory temperature target limit and/or lower then the memory temperature critical limit. The memory temperature critical limit may be the upper memory temperature limit or maximum memory operating temperature. The memory target temperature may be lower memory temperature limit or average memory operating temperature.

PD controller 325 may include any system, device, or apparatus configured to, based on error signal 320, generate a PD power signal. The PD power signal may be a basis for the power adjustment desired for changes to temperature margin and a polling rate or ramp rate of the temperature measurement. The PD power signal may be generated by applying a set of rules which was generated via multiple analyses, common logic, and simulation tests such as via Simulink™. PD controller 325 may be implemented in any suitable manner. For example, PD controller 325 may include a fuzzy logic controller.

PI controller 330 may include any system, device, or apparatus configured to, based on the current temperature measurement and/or the error signal generated by input controller 310 to generate a PI power signal. The PI power signal may also be based on the temperature margin and a sum of error values over time. The PI power signal may be a basis for the power adjustment desired for changes to temperature margin and a polling rate or ramp rate of the temperature measurement. The PI power signal may be generated by applying a set of rules which was generated via multiple analyses, common logic, and simulation tests such as via Simulink. PI controller 330 may be implemented in any suitable manner. For example, PI controller 330 may include a fuzzy logic controller.

PI gain controller 335 may include any system, device, or apparatus configured to control the ramp rate/polling rate of the memory thermal controller. In particular, PI gain controller 335 may be configured to determine a polling rate gain or ramp rate gain which is a PI scalar value based on the polling rate of a temperature and a maximum rate of change between polling events. The temperature may be retrieved and/or received from a temperature sensor or determined in any other suitable manner. PI gain controller 335 may be configured to determine the PI controller gain signal based on a lookup table, similar to lookup table 600, which includes the relationship of polling rate and error rate to PI gain magnitude. PI gain controller 335 may factor the PI power signal to avoid PI aggressive power adjustments when sensor polling time is large. This lookup table may be generated by multiple analyses, common logic, and simulation tests performed via Simulink.

Steady-state controller 340 may include any system, device, or apparatus configured to stabilize the PI power signal, generating a modified PI power signal as output. To maintain temperature stability and prevent power fluctuation, steady-state controller 340 may be configured to disable PD controller 325 and PI power signal as input based on the degree of the fluctuation of the temperature measurements of the memory subsystem in comparison to a threshold.

Power adjustment controller 345 may generate a power adjustment signal based on the PI power signal, PI controller gain signal, and modified PI output driving signal. In addition, power adjustment controller 345 may apply a PD power signal if available, such as when PD controller 325 is enabled. The power adjustment signal may be a power capping value used in adjusting the power to the memory subsystem. The power adjustment signal may be further processed by memory power cap controller 350 to determine whether the power adjustment signal is within an allowable range. The allowable range is typically a static limit beyond which the memory subsystem becomes unstable.

Memory power cap controller 350 may further adjust the power adjustment signal to put it within the allowable range prior to transmitting the power adjustment signal to the power cap controller 355. The power cap controller 355 which may transmit the power adjustment signal to various components such as to a management controller. The management controller may be configured to determine whether or not to cap the power to the memory subsystem based on the power adjustment signal. For example, if the current temperature of the memory subsystem increases and approaches a temperature setpoint based on a temperature margin, the adaptive closed-loop power throttling may be initiated and cap the power to the memory subsystem. For example, the adaptive close loop power throttling by the memory thermal controller may be initiated based on a signal received from the management controller. The adaptive closed-loop power throttling of the memory subsystem may also be initiated if one or more components of information handling system approach a temperature setpoint. The initiation may be performed in addition to or instead of power throttling of the components approaching the temperature setpoint. Determining whether to control the power consumption of the memory subsystem is performed subsequent to controlling, by a thermal controller, power consumption of the other components like a central processing unit such as via a fan, wherein the current temperature of the memory subsystem increases despite the fan running in full capacity, an instances when there is a fan failure or something similar.

Thermal response receiver 360 may be configured to receive and/or retrieve a current temperature measurement of the memory subsystem from a temperature sensor. The current temperature measurement may be transmitted to input controller 310 for comparison to temperature setpoint 305 and/or further processing.

Figures 4, 5:
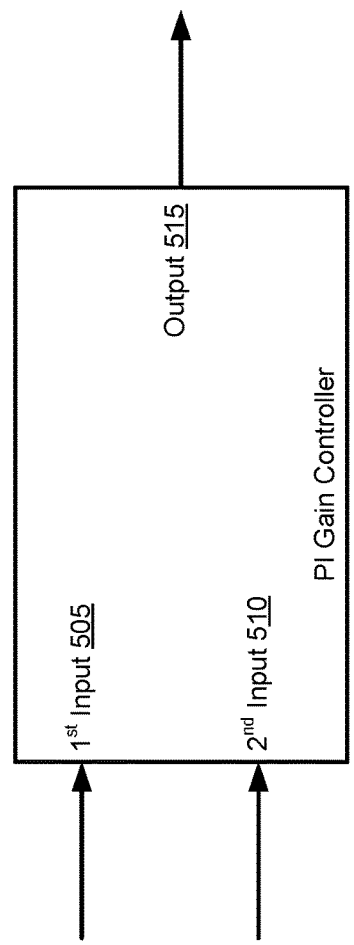
FIG. 4 is a diagram illustrating a table of rules for generating a proportional-integral power signal, according to an embodiment of the present disclosure.
FIG. 5 is a block diagram illustrating a system for generating a proportional-integral controller gain signal, according to an embodiment of the present disclosure.

FIG. 4 shows a table 400 that includes a plurality of entries 405, wherein each entry is a set of rules and its numerical equivalent, to be applied by the PI controller and/or PD controller to determine a PI power signal and/or a PD power signal accordingly. Plurality of entries 405 includes rules 410 and numeral equivalent 415 which may have been generated by multiple analysis, common logic, and simulation tests. The simulation tests may be performed using various mechanisms such as via Simulink.

FIG. 5 shows a PI gain controller 500 which may be configured to generate a PI controller gain signal. PI gain controller 500 may receive several inputs such as a first input 505 and a second input 510. PI gain controller 500 generates an output 515 based on the received inputs. First input 505 may be a maximum rate of change of measured temperature between polling events. Second input 510 may be a polling rate or ramp rate is a rate at which temperature of the memory subsystem is sampled from a temperature sensor in a period such as in seconds, minutes etc. For example, the polling rate or the ramp rate is the rate at which the temperature of memory 210 may be sampled from temperature sensor 235 of FIG. 2 once every second. Output 515, which may be referred to as a PI controller gain signal, may be determined from a lookup table such as lookup table 600 of FIG. 5.

Figures 6, 7:
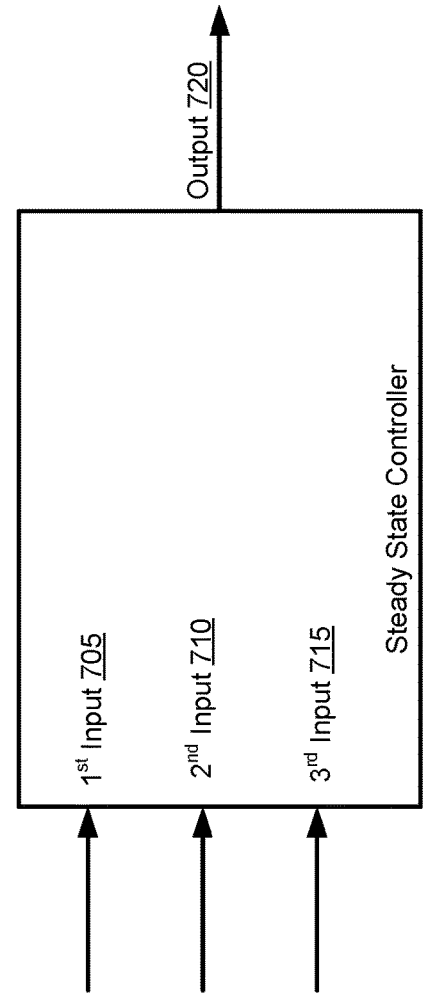
FIG. 6 is a diagram illustrating a lookup table for generating a proportional-integral controller gain signal, according to an embodiment of the present disclosure.
FIG. 7 is a block diagram illustrating a system for generating a modified proportional-integral power signal, according to an embodiment of the present disclosure.

FIG. 6 shows a lookup table 600 that includes a plurality of entries 602, wherein each entry sets forth a PI controller gain signal which is indexed by one of a plurality of polling rates 604 in seconds of a measured temperature and one of a plurality of rates of change of the measured temperature between polling events of the measured temperature. Thus, PI controller gain signal is based on the polling rate or ramp rate at which temperature is sampled from a temperature sensor and a maximum rate of change of such measured temperature between polling events. A memory thermal controller may read from lookup table 600 an entry corresponding to the polling rate and the maximum rate of change. The entry may be the PI gain which is an output of PI gain controller 335 of FIG. 3. The entry may be applied to steady-state controller 340 of FIG. 3 as input.

FIG. 7 shows a block diagram of a steady-state controller 700 for maintaining the stability of temperature values and preventing power fluctuation. Steady-state controller 700 receives several inputs such as a first input 705, a second input 710, and a third input 715. Steady-state controller 700 generates an output 720 based on one or more of the received inputs. To maintain temperature and prevent power fluctuation, steady-state controller 700 may be configured to disable third input 715 when there is a significant temperature change, wherein the significant temperature change may be based on a threshold. Third input 715 may be based on the output of the PI controller such as a PI power signal. Third input 715 may be disabled by setting it to zero. When third input 715 as an input, PD controller may be enabled by setting the value of parameter "PD delta error input gain" in the thermal table to a value greater than zero. Enabling the PD controller allows the PD controller to manage the power consumption of the memory subsystem when the value of the temperature measurement of the memory subsystem is not stable, such as when there is a large variation in temperature values.

First input 705, also referred to as a steady-state value, which was determined in real-time by a weighted average calculation of the last "N" number of absolute delta error values stored in a history buffer module, wherein N is a thermal table parameter that determines how many delta error values are used for calculation of the value of the steady-state parameter. First input 705 may be compared against a second input 710 which is a thermal table parameter and also referred to as a steady-state threshold value. If first input 705 is greater or equal to second input 710, which means that the temperature value is not steady, then third input 715 is disabled. If first input 705 is less than second input 710, which means that the temperature value is steady, then third input 715 is enabled and part of the calculation of output 720.

FIG. 8 shows an example power cap table 800 that includes a plurality of entries 802, wherein each entry includes sensor information and associated power capping parameters 804 which may be indexed by a sensor identifier. Power capping parameters 804 includes parameters to indicate whether to enable automated power capping, a power cap temperature target, and the associated power subsystem to cap. In one example entry, a sensor named "Memory" has automated power capping enabled, wherein the power cap temperature target is 30%, which is customizable, and is applied to the memory subsystem. This example entry may be used by memory thermal controller 225 of FIG. 2, wherein the power cap temperature target, also referred as a temperature margin, is used in calculating the memory temperature setpoint of FIG. 3. In this example, if enable automated power capping is set to "YES", then the management controller can trigger the memory thermal controller to initiate power capping measures. Entries 802 may be updated via a graphical or command-line user interface associated with the management controller.

Figure 9:
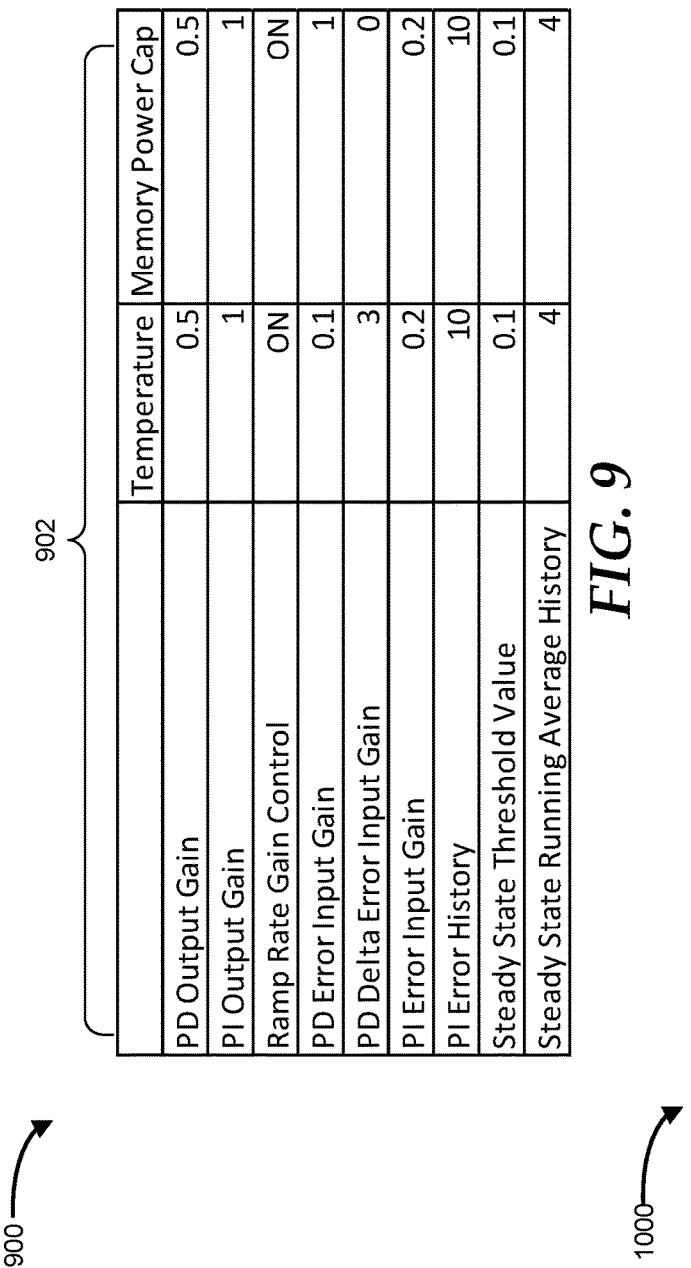
FIG. 9 is a diagram illustrating a table of thermal parameters for closed-loop memory power capping, according to an embodiment of the present disclosure.

FIG. 9 shows an example thermal table 900 that includes a plurality of entries 902, wherein each entry includes a parameter and parameter value associated with temperature, system power cap, and power cap for one or more subsystems such as memory and CPU. In one example entry, the parameter "PD delta error input gain" for the memory power cap is set to zero. This example entry may be used to disable the PD controller similar to PD controller 325 of FIG. 3. Thus, adjusting or tuning parameter values in thermal table 900 allows the ability to perform various calculations and/or procedures such as to turn on or off the PD controller based on the power sensor adjustment need of the memory subsystem.

Figure 10:
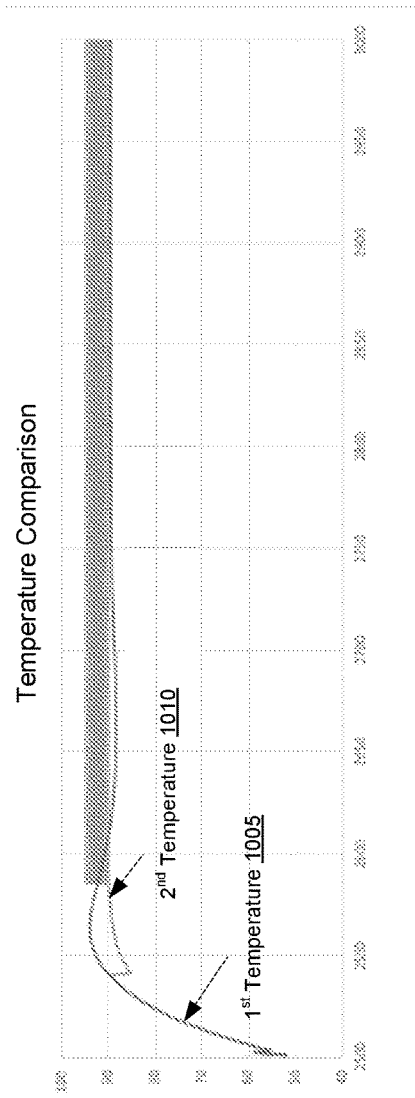
FIG. 10 is a diagram illustrating a graph comparing temperatures associated with current disclosure and traditional closed-loop thermal throttling, according to an embodiment of the present disclosure.

FIG. 10 shows an example graph 1000 that shows a temperature over time comparison between a first temperature 1005 and a second temperature 1010. First temperature 1005 is associated with the present disclosure while second temperature 1010 is associated with traditional thermal control. As shown, first temperature 1005 appears to be stable over time compared with the fluctuating changes in temperature of second temperature 1010.

Figure 11:
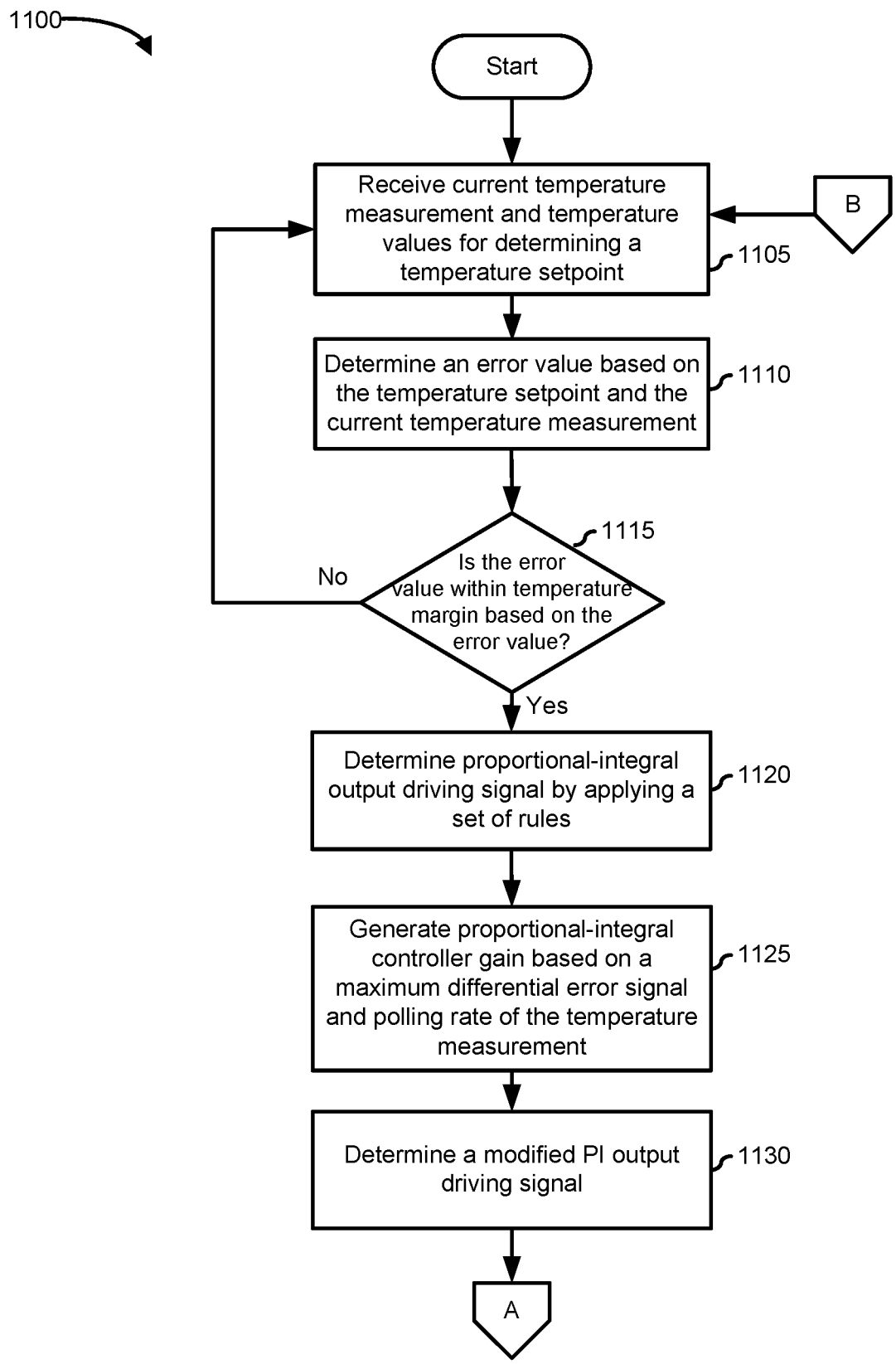
FIGS. 11 and 12 are flowcharts illustrating a method for closed-loop memory power capping, according to an embodiment of the present disclosure.

FIG. 11 shows a flowchart of an example method 1100 for power capping of a memory subsystem based on a temperature margin associated with the memory subsystem. The actual power consumption of the memory subsystem depends on its workload. A power cap may be configured to reduce power consumption of the memory subsystem within a certain threshold. When the power cap is configured, the performance of the memory subsystem may be dynamically adjusted to maintain the power consumption within a specified power limit and/or temperature. Method 1100 may be performed by one or more components of information handling system 200 of FIG. 2. In particular, method 1100 may be performed by a memory thermal controller similar to memory thermal controller 225 of FIG. 2. While embodiments of the present disclosure are described in terms of information handling system 205 of FIG. 2, it should be recognized that other systems may be utilized to perform the described method.

Method 1100 typically starts at block 1105 where the method receives a current temperature measurement from a temperature sensor associated with a memory subsystem. In addition, one or more temperature values used for determining a temperature setpoint may be received. The temperature values may also be retrieved from a thermal table similar to thermal table 900 of FIG. 9. The method proceeds to block 1110.

At block 1110, the method determines an error value based on the value of the temperature setpoint and the current temperature measurement value to generate an error signal which may be communicated to other components of the memory thermal controller. The error value may be the difference between the temperature setpoint and the current temperature measurement.

The method proceeds to decision block 1115, where the method determines whether the error value is within the temperature margin. For example, assuming that the temperature margin is set to thirty percent. If the temperature critical limit is equal to ninety-five degrees centigrade and the temperature target is equal to ninety degrees centigrade and when the current temperature measurement approaches within the temperature margin of the window of five degrees, which is the temperature critical limit less the temperature target limit. Here, thirty percent of five degrees is one and a half degrees. If the method determines that the error value is within the temperature margin, then the method proceeds to block 1120. If the method determines that the error value is not within the temperature margin, then the method proceeds to block 1105.

At block 1120, the memory subsystem power capping is triggered via the memory thermal controller. At this point, the PD controller is disabled to prevent power reduction on initial temperature fluctuations which is generally transitory such as during a boot process of the information handling system. During this transition period, a thermal fan controller similar to thermal controller 230 of FIG. 2 may handle the temperature fluctuations. The memory thermal controller is triggered to enable power capping for the memory subsystem when the thermal fan controller is unable to adjust the temperature of the memory subsystem in certain situations such as if the cooling capacity of the fans is reached. The memory thermal controller may be triggered to enable an automated granular power capping when approaching a predefined target, a PI power signal is based on the value of the error generated in block 1110 and determined by applying a set of rules as shown in FIG. 4. The PI output power signal may be used to change the power applied to the memory subsystem. The method proceeds to block 1125.

At block 1125, the method determines a PI controller gain signal which is indexed at a lookup table by a polling rate of temperature measurements such as by a temperature sensor and a maximum rate of change of the measured temperature between polling events of the measured temperature. The maximum rate of change of the measured temperature may be detected during a suitable period such as during a previous number of polling cycles and included in the lookup table which is stored in non-volatile memory to be retrieved by the method. The method may read from the lookup table an entry corresponding to the polling rate and the maximum rate of change of the measured temperature, such entry having a PI controller gain signal to be applied or factored into to the PI power signal of block 1120. By applying or factoring into the PI power signal, the method avoids aggressively adjusting the power to the memory subsystem when the polling time is large. The method proceeds to block 1130.

At block 1130, the method determines a modified PI power signal which stabilizes the PI power signal to prevent power fluctuation. In particular, the modified PI power signal may be determined by a steady-state controller similar to steady-state controller 700 of FIG. 7. A steady-state value is determined based on a number of delta error values and compared with a steady-state threshold value. If the steady-state value is greater or equal to the steady-state threshold, the PI power signal is not used as input in determining the modified PI power signal. Otherwise, the PI power signal is used as an input in determining the modified PI power signal. The method proceeds to block 1205 of FIG. 12.

Figure 12:
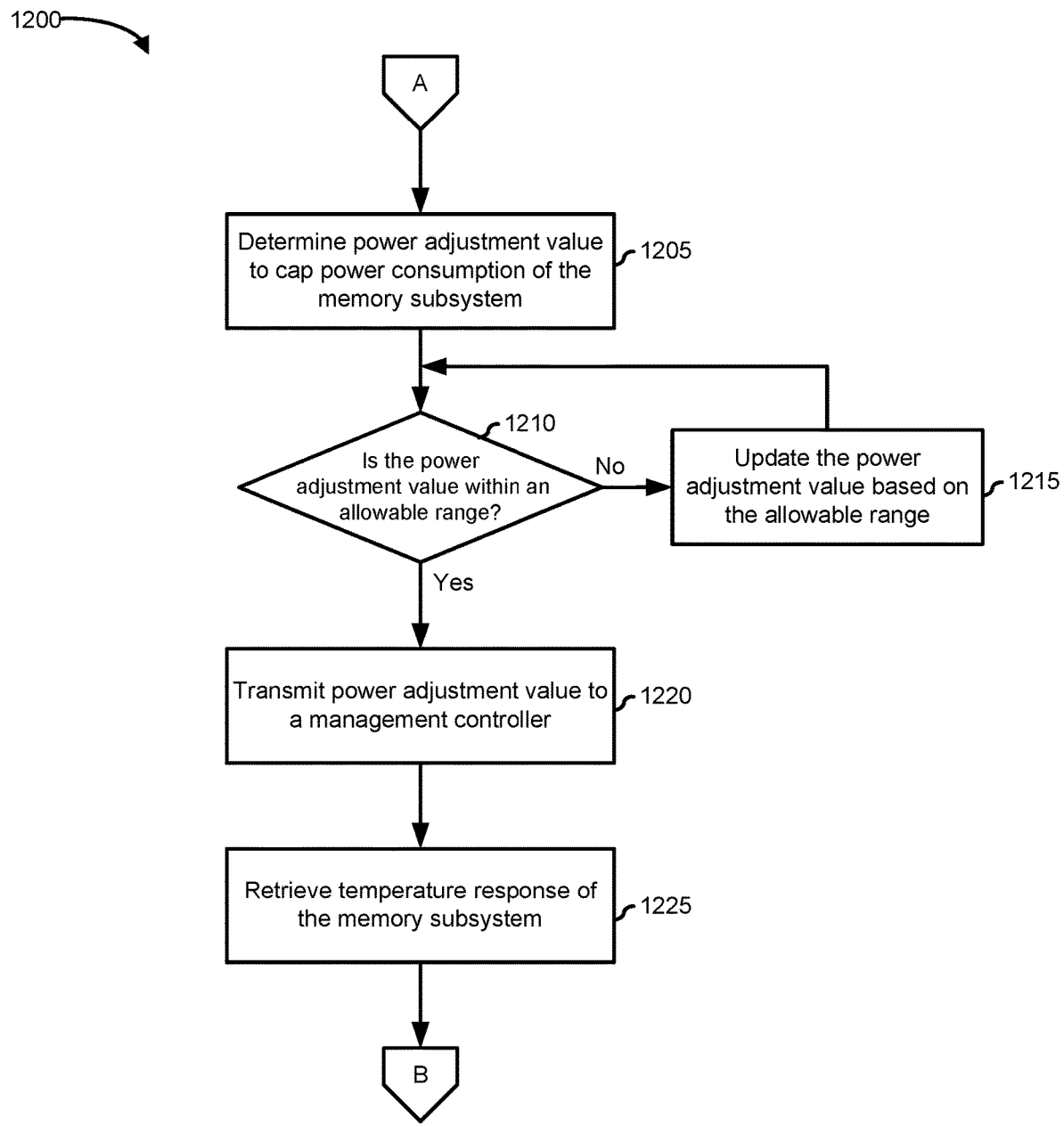

FIG. 12 shows a flowchart of an example method 1200 for power capping of the memory subsystem based on the temperature margin associated with the memory subsystem. In particular, method 1200 is a continuation of method 1100 of FIG. 1. Method 1200 typically starts at block 1205 where the method determines the power adjustment value to cap the power consumption of the memory subsystem. The power adjustment may be based on the modified PI power signal and/or output from the PID controller when enabled. The method proceeds to decision block 1210.

At decision block 1210, the method determines whether the power adjustment value is within an allowable range. The allowable range of power adjustment value may be identified from a lookup table such as the power cap table or the thermal table. If the power adjustment value is within the allowable range, then the "YES" branch is taken and the method proceeds to block 1220. If the power adjustment value is not within the allowable range, then the "NO" branch is taken and the method proceeds to block 1215.

At block 1215, the method updates the power adjustment value based on the allowable range. The power adjustment value may be increased or decreased accordingly to be within the allowable range. The method loops back to decision block 1210. At block 1220, the method transmits the power adjustment value to a management controller similar to management controller 220 of FIG. 2. The management controller caps the power to the memory subsystem based on the power adjustment value. For example, if the power adjustment value is positive, then the power consumption of the memory subsystem may be capped accordingly such as the power cap is greater if the power adjustment value is higher. If the power adjustment below is zero or negative, then the power consumption of the memory subsystem may not be capped. The method proceeds to block 1225.

At block 1225, the method retrieves the thermal response of the memory subsystem subsequent to the power adjustment. For example, the method retrieves the current temperature of the memory subsystem from a temperature sensor. The current temperature is then transmitted to the memory thermal controller. The method then proceeds to block 1105 of FIG. 11.

Although FIG. 11, and FIG. 12 show example blocks of method 1100 and method 1200 in some implementation, method 1100 and method 1200 may include additional blocks, fewer blocks, different blocks, or differently arranged blocks than those depicted in FIG. 11 and FIG. 12. Additionally, or alternatively, two or more of the blocks of method 1100 and method 1200 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    receiving, by a processor, temperature values to determine a temperature setpoint for a memory subsystem based on a memory temperature limit less a product of temperature margin and difference between the memory temperature limit and a memory temperature target;

receiving a temperature measurement from a temperature sensor associated with the memory subsystem;

calculating an error value that is a difference between the temperature setpoint and the temperature measurement;

determining whether the error value is within a temperature margin;

in response to determining that the error value is within the temperature margin, triggering power capping for the memory subsystem and disabling a proportional-differential controller, wherein the power capping includes determining a proportional-integral power signal based on the terror value;

determining a proportional-integral gain based on a maximum rate of change of the temperature measurement between polling events of the temperature measurement and a polling rate of the temperature measurement;

determining a modified proportional-integral power signal by factoring the proportional-integral gain into the proportional-integral power signal, wherein the modified proportional-integral power signal is used to determine a power adjustment value of the memory subsystem; and capping power consumption of the memory subsystem to a power limit, wherein the power limit is decreased as the temperature margin is reduced.

2. The method of claim 1, receiving a signal from a management controller to initiate the capping of the power consumption of the memory subsystem.

3. The method of claim 1, wherein the determining of the proportional-integral power signal is performed based on a set of rules.

4. The method of claim 1, wherein the temperature margin is relative to a temperature critical limit.

5. The method of claim 1, wherein the determining the modified proportional-integral power signal is based on a comparison between a steady-state value and a steady-state threshold value.

6. The method of claim 5, further comprising determining if the steady-state value is greater than or equal to the steady-state threshold value then not including the proportional-integral power signal as an input in determining the modified proportional-integral power signal.

7. The method of claim 5, further comprising if the steady-state value is less than the steady-state threshold value, then including the proportional-integral power signal as input in determining the modified proportional-integral power signal.

8. The method of claim 5, further comprising if the steady-state value is greater than or equal to the steady-state threshold value then enabling the proportional-differential controller.

9. The method of claim 5, further comprising if the steady-state value is greater than or equal to the steady-state threshold value then disabling proportional-integral controller.

10. The method of claim 1, wherein the determining whether to cap the power consumption of the memory subsystem is performed after capping, by a thermal controller, power consumption of a central processing unit.

11. An information handling system, comprising:
a management controller configured to determine whether to initiate cap of power consumption of a memory subsystem of the information handling system; and
a closed-loop memory thermal controller configured to:
receive temperature values to determine a temperature setpoint for the memory subsystem based on a memory temperature limit less a product of temperature margin and difference between the memory temperature limit and a memory temperature target;
receive a temperature measurement from a temperature sensor associated with the memory subsystem;
calculate an error value that is a difference between the temperature setpoint and the temperature measurement;
if the error value is within a temperature margin, then trigger power capping for the memory subsystem and disable a proportional-differential controller, wherein the power capping includes to determine a proportional-integral power signal based on the error value;
determine a proportional-integral gain based on a maximum rate of change of the temperature measurement between polling events of the temperature measurement and a polling rate of the temperature measurement;
determine a modified proportional-integral power signal by factoring the proportional-integral gain into the proportional-integral power signal, wherein the modified proportional-integral power signal is used to determine a power adjustment value of the memory subsystem; and
cap the power consumption of the memory subsystem to a power limit, wherein the power limit is decreased as the temperature margin is reduced.

12. The information handling system of claim 11, wherein a signal is transmitted by the management controller to initiate the capping of the power consumption of the memory subsystem.

13. The information handling system of claim 11, wherein the determination of the proportional-integral power signal is performed based on a set of rules.

14. The information handling system of claim 11, wherein the closed-loop memory thermal controller is further configured to determine if a steady-state value is greater than or equal to a steady-state threshold value then not including the proportional-integral power signal as an input in determining the modified proportional-integral power signal.

15. The information handling system of claim 11, wherein the closed-loop memory thermal controller is further configured to disable the proportional-differential controller associated with the closed-loop memory thermal controller.

16. A non-transitory computer-readable medium including code that when executed performs a method, the method comprising:
receiving temperature values to determine a temperature setpoint for a memory subsystem based on a memory temperature limit less a product of temperature margin and difference between the memory temperature limit and a memory temperature target;
receiving a temperature measurement from a temperature sensor associated with the memory subsystem;
calculating an error value which is a difference between the temperature setpoint and the temperature measurement;
if the error value is within a temperature margin, then triggering power capping for the memory subsystem and disabling a proportional differential controller, wherein the power capping includes determining a proportional-integral power signal based on the error value;

determining a proportional-integral gain based on a maximum rate of change of the temperature measurement between polling events of the temperature measurement and a polling rate of the temperature measurement;

determining a modified proportional-integral power signal by factoring the proportional-integral gain into the proportional-integral power signal, wherein the modified proportional-integral power signal is used to determine a power adjustment value of the memory subsystem; and capping power consumption of the memory subsystem to a power limit, wherein the power limit is decreased as the temperature margin is reduced.

17. The non-transitory computer-readable medium of claim 16, wherein the method further comprising receiving a signal from a management controller to initiate the capping of the power consumption of the memory subsystem.

18. The non-transitory computer-readable medium of claim 16, wherein the determining whether to cap the power consumption of the memory subsystem is performed subsequent to capping, by a thermal controller, power consumption of a central processing unit.

19. The non-transitory computer-readable medium of claim 16, wherein the determining of the proportional-integral power signal is performed based on a set of rules.

20. The non-transitory computer-readable medium of claim 16, wherein the determining the modified proportional-integral power signal is based on a comparison between a steady-state value and a steady-state threshold value.

* * * * *